United States Patent
Miyata

(10) Patent No.: US 12,540,881 B2
(45) Date of Patent: Feb. 3, 2026

(54) ENGINE ABNORMALITY PREDICTING DEVICE

(71) Applicant: TOYOTA JIDOSHA KABUSHIKI KAISHA, Toyota (JP)

(72) Inventor: Hisatsugu Miyata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 273 days.

(21) Appl. No.: 18/471,587

(22) Filed: Sep. 21, 2023

(65) Prior Publication Data

US 2024/0183751 A1 Jun. 6, 2024

(30) Foreign Application Priority Data

Dec. 2, 2022 (JP) .................. 2022-193666

(51) Int. Cl.
*G01M 15/05* (2006.01)
*F02B 77/08* (2006.01)

(52) U.S. Cl.
CPC .................. *G01M 15/05* (2013.01)

(58) Field of Classification Search
CPC ......... G01M 15/05; F02B 77/08; F02B 47/02; F02B 43/12; F02B 37/04; F02B 75/00; F02B 53/02; F02B 3/08; F02B 47/00; F02M 25/0227; F02M 25/0222; F02D 41/042

See application file for complete search history.

(56) References Cited

U.S. PATENT DOCUMENTS

| | | | |
|---|---|---|---|
| 2014/0123963 A1* | 5/2014 | Glugla | F02M 25/0227 123/542 |
| 2018/0181090 A1 | 6/2018 | Shimada et al. | |
| 2019/0178144 A1* | 6/2019 | Aoki | F02D 41/1454 |

FOREIGN PATENT DOCUMENTS

| | | |
|---|---|---|
| JP | 2013-234574 A | 11/2013 |
| JP | 2015-232308 A | 12/2015 |

\* cited by examiner

*Primary Examiner* — Laura Martin
*Assistant Examiner* — Anthony W Megna Fuentes
(74) *Attorney, Agent, or Firm* — SoraIP, Inc.

(57) ABSTRACT

Based on at least one of an engine speed which is a rotational speed of the engine, an engine load factor which is a load factor of the engine, a vehicle speed of the vehicle, and an on-off state of a brake in the vehicle, a use state of the vehicle is determined, and based on an elapsed time after the engine is stopped, whether or not condensed water is generated in the engine is determined, and an engine abnormality is predicted based on the determined use state of the vehicle when the condensed water is generated in the engine or when the amount of condensed water generated in the engine is equal to or larger than a predetermined amount of water.

2 Claims, 3 Drawing Sheets

ENGINE ABNORMALITY PREDICTING DEVICE

CROSS-REFERENCE TO RELATED APPLICATION

This application claims priority to Japanese Patent Application No. 2022-193666 filed on Dec. 2, 2022, incorporated herein by reference in its entirety.

BACKGROUND

1. Technical Field

The disclosure relates to an abnormality predicting device for an engine.

2. Description of Related Art

Conventionally, as an abnormality predicting device for an engine of this type, a proposal has been made to estimate an amount of condensed water accumulated in an exhaust pipe using an exhaust temperature, a gas flow rate, and ambient air temperature, when the engine is started, and to operate a heater for heating an exhaust gas sensor when the estimated amount of condensed water is determined to be no more than a predetermined value (see Japanese Unexamined Patent Application Publication No. 2013-234574 (JP 2013-234574 A), for example). In this apparatus, when determination is made that the amount of condensed water exceeds the predetermined value, the heater for heating the exhaust gas sensor is not operated, thereby suppressing occurrence of abnormality in the exhaust gas sensor due to temperature distribution of the exhaust gas sensor becoming non-uniform due to operation of the heater.

SUMMARY

However, the above-described abnormality predicting device for an engine does not take into consideration a state of use of a vehicle. Even when condensed water is produced in the engine, an abnormality does not occur depending on the state of use of the vehicle, and accordingly there is desire to predict occurrence of an abnormality in the engine more appropriately.

A primary object of the abnormality predicting device for an engine according to the disclosure is to predict occurrence of an abnormality in an engine more appropriately.

In order to achieve the above-described primary object, the abnormality predicting device for an engine according to the disclosure adopts the following means.

An abnormality predicting device for an engine according to the disclosure is an abnormality predicting device predicting an engine abnormality that is an abnormality of an engine installed in a vehicle.
A state of use of the vehicle is determined based on at least one of engine revolutions that are revolutions of the engine, an engine load factor that is a load factor of the engine, a vehicle speed of the vehicle, and an on-off state of a brake of the vehicle.
Determination is made regarding whether condensed water is produced in the engine, based on elapsed time after stopping the engine.
When condensed water is produced in the engine, or during condensed water production when an amount of condensed water produced in the engine is no less than a predetermined amount of water, the engine abnormality is predicted based on the state of use of the vehicle that is determined.

In the abnormality predicting device for an engine according to the disclosure, the state of use of the vehicle is determined based on at least one of the engine revolutions that are revolutions of the engine, the engine load factor that is the load factor of the engine, the vehicle speed of the vehicle, and the on-off state of the brake of the vehicle. Also, determination is made regarding whether condensed water is produced in the engine, based on elapsed time after stopping the engine. Further, when condensed water is produced in the engine, or during condensed water production when the amount of condensed water produced in the engine is no less than the predetermined amount of water, the engine abnormality is predicted based on the state of use of the vehicle that is determined. Taking the state of use of the vehicle into consideration enables prediction of the occurrence of abnormality in the engine more appropriately. Now, an example of the "predetermined amount of water" may be a threshold value of the amount of water for determining whether the amount of condensed water is great enough to cause an abnormality in the engine.

In the abnormality predicting device according to the disclosure, an operation state of the engine may be determined as the state of use of the vehicle, based on an operation point including the engine revolutions and the engine load factor when the engine was operated in the past. Thus, the operation state of the engine is taken into consideration, and accordingly the occurrence of the abnormality of the engine can be predicted more appropriately.

In the abnormality predicting device according to the disclosure, in an aspect in which the operation state of the engine is determined as the state of use of the vehicle, when the condensed water is produced, and the operation state of the engine is a high-revolutions high-load heavy-usage state in which the engine is frequently operated at high revolutions and a high load factor, corrosion of a cylinder of the engine may be predicted as the engine abnormality. Thus, abnormality of the engine due to corrosion of the cylinder can be predicted more appropriately. In this case, when the condensed water is produced and the operation state of the engine is the high-rotation high-load heavy-usage state, and when a coolant temperature of the engine at time of starting the engine is lower than a predetermined coolant temperature, corrosion of the cylinder may be predicted as the engine abnormality. Thus, when the coolant temperature of the engine at the time of starting the engine is no lower than the predetermined coolant temperature, and the condensed water produced in the engine evaporates, corrosion of the cylinder of the engine is not predicted, and accordingly abnormality due to corrosion of the cylinder can be predicted more appropriately. Now, an example of the "predetermined temperature" may be a threshold value of a temperature for determining whether warm-up of the engine is completed, or the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, a mode for carrying out the present disclosure will be described with reference to an embodiment.

Figure 1:
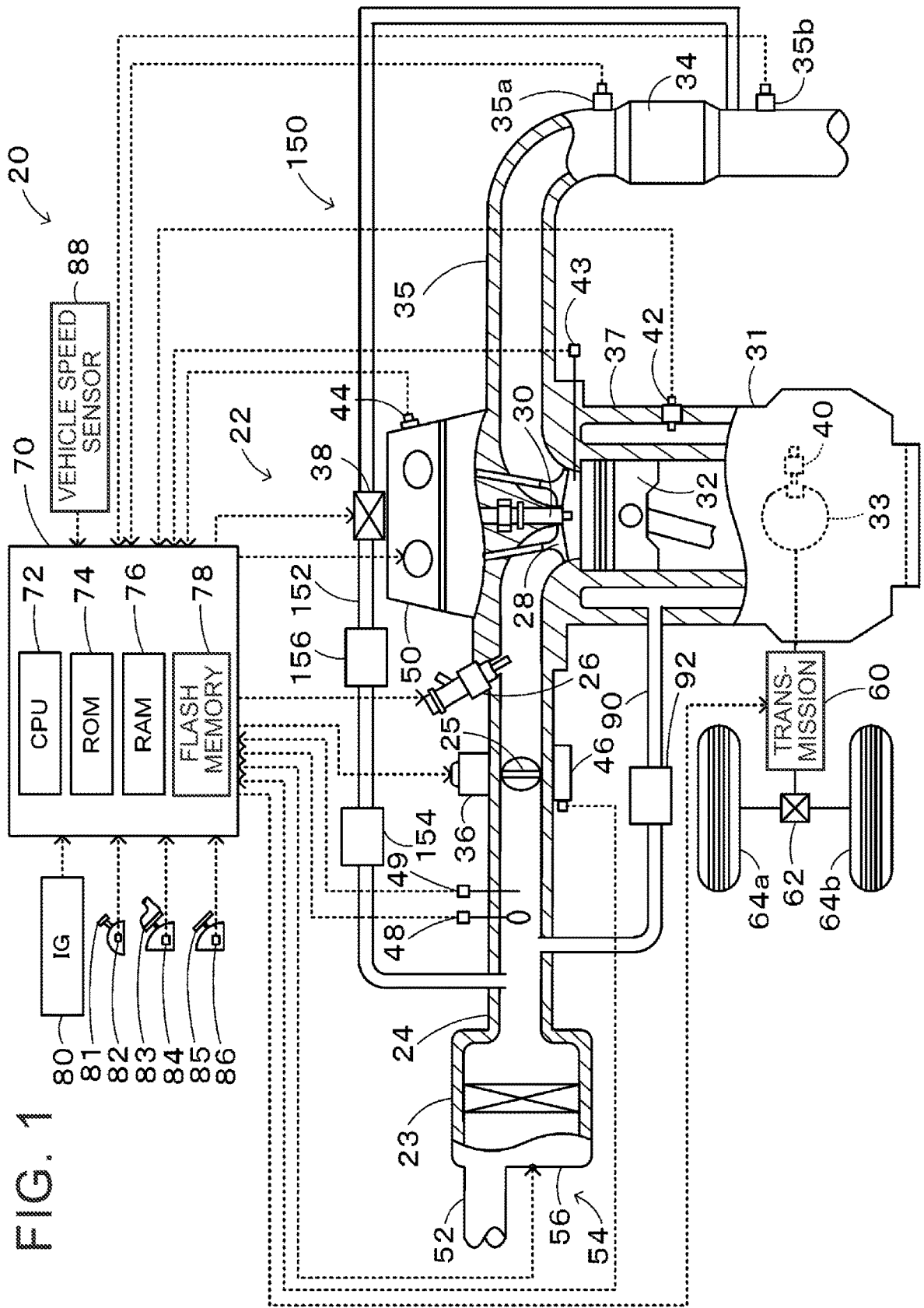
FIG. 1 is a configuration diagram schematically showing a configuration of a vehicle 20 equipped with an engine device according to an embodiment of the present disclosure.

FIG. 1 is a configuration diagram schematically showing a configuration of a vehicle 20 equipped with an abnormality predicting device for an engine according to an embodiment of the present disclosure. As shown in the drawings, the vehicle 20 of the embodiment includes an engine 22, an EGR device 150, a transmission 60 that changes the power of the engine 22 and transmits the power to the drive wheel 64a, 64b via the differential gear 62, and an electronic control unit (hereinafter, referred to as "ECU") 70. In the embodiment, ECU 70 corresponds to an "engine-abnormality predicting device".

The engine 22 is configured as an internal combustion engine that outputs power using gasoline as fuel. The engine 22 sucks air from the intake port 52 into the air cleaner 23, causes the air cleaned by the air cleaner 23 to flow through the intake pipe 24, and injects gasoline from the fuel injection valve 26. Then, the air-fuel mixture is sucked into the combustion chamber via the intake valve 28, and is explosively combusted by the electric spark by the spark plug 30, and the reciprocating motion of the piston 32 depressed by the energy is converted into the rotational motion of the crankshaft 33. The exhaust gas from the combustion chamber is discharged to the outside air through a purifying device 34 having a purifying catalyst (three-way catalyst) for purifying harmful components of carbon monoxide (CO), hydrocarbons (HC), and nitrogen oxides (NOx). In addition, the exhaust gas and the unburned gas generated in the combustion chamber are not only discharged to the outside air, but also flowed out from the gap between the piston 32 and the cylinder 37 into the space in the crankcase 31 (hereinafter, the exhaust gas and the unburned gas thus flowed out are referred to as "blow-by gas"). Engine oil is stored in an oil pan at a lower portion of the crankcase 31.

The engine 22 is provided with a blow-by gas pipe 90 that connects the crankcase 31 to the downstream side of the throttle valve 25 in the intake pipe 24. A blow-by valve 92 is attached to the blow-by gas pipe 90 to flow the provider gas in one direction (a direction from the crankcase 31 toward the intake pipe 24), and the blow-by gas is recirculated to the intake pipe 24 through the blow-by gas pipe 90. The operation of the engine 22 is controlled by an ECU 70.

EGR device 150 includes an EGR pipe 152, an EGR bulb 154, an EGR cooler 156, and a stepping motor (not shown). EGR pipe 152 communicates with the intake pipe 24 downstream of the purifying device 34 of the exhaust pipe 35. EGR bulb 154 is provided in EGR pipe 152 and is driven by a stepping motor (not shown) controlled by an ECU 70. EGR cooler 156 is provided in EGR pipe 152, and cools the exhausted air passing through EGR pipe 152. In EGR device 150, the opening degree of EGR valve 154 is adjusted by a stepping motor, so that the recirculation flow rate of the exhaust gas in the exhaust pipe 35 is adjusted and recirculated to the intake pipe 24.

ECU 70 is configured as a microprocessor centered on a CPU 72, and includes a ROM 74 for storing a process program, a RAM 76 for temporarily storing data, a flash memory 78 for storing data, and an input/output port (not shown) in addition to CPU 72. In ECU 70, signals from various sensors are input via an input port.

Examples of the signal inputted to ECU 70 include a crank angle θcr from a crank position sensor 40 that detects a rotational position of the crankshaft 33, an in-cylinder pressure from a pressure sensor 43 mounted in the combustion chamber, a cam position from a cam position sensor 44 that detects a rotational position of an intake valve 28 that performs intake and exhaust to the combustion chamber and a camshaft that opens and closes an exhaust valve, and a throttle opening degree TH from a throttle valve position sensor 46 that detects a position of the throttle valve 25. Further, the air-fuel ratio AF from the air-fuel ratio sensor 35a, the oxygen signal from the oxygen sensor 35b, the coolant temperature Tw from the water temperature sensor 42 for detecting the temperature of the coolant of the engine 22, the intake air amount Qa from the air flow meter 48 attached to the intake pipe 24, the intake air temperature from the temperature sensor 49 attached to the intake pipe 24, and the intake opening degree from the valve sensor for detecting the opening degree of the valve 56 can also be mentioned. Further, an ignition signal from the ignition switch 80, a shift position SP from the shift position sensor 82 for detecting an operation position of the shift lever 81, an accelerator operation amount Acc from the accelerator pedal position sensor 84 for detecting a depression amount of the accelerator pedal 83, a brake pedal position BP from the brake pedal position sensor 86 for detecting a depression amount of the brake pedal 85, and a vehicle speed V from the vehicle speed sensor 88 can also be exemplified.

Various control signals for controlling the operation of the engine 22 are output from ECU 70 via an output port. Examples of the signal outputted from ECU 70 include a drive signal to the fuel injection valve 26, a drive signal to the throttle motor 36 that adjusts the position of the throttle valve 25, a control signal to the ignition coil 38 integrated with the igniter, and a control signal to the valve motor that adjusts the opening degree of the valve 56. Further, a control signal to the stepping motor of EGR device 150 and a control signal to the transmission 60 are also output from ECU 70 via an output port.

ECU 70 calculates the rotational speed of the crankshaft 33, that is, the rotational speed (engine rotational speed) Ne of the engine 22, at predetermined time intervals (for example, every several msec) based on the crank angle θcr from the crank position sensor 40. Further, ECU 70 calculates a load factor (a ratio of a volume of air actually sucked in one cycle to a stroke volume per cycle of the engine 22, an engine load factor) KL based on the calculated rotational speed Ne of the engine 22 and the intake air amount Qa from the air flow meter 48.

Figure 2:
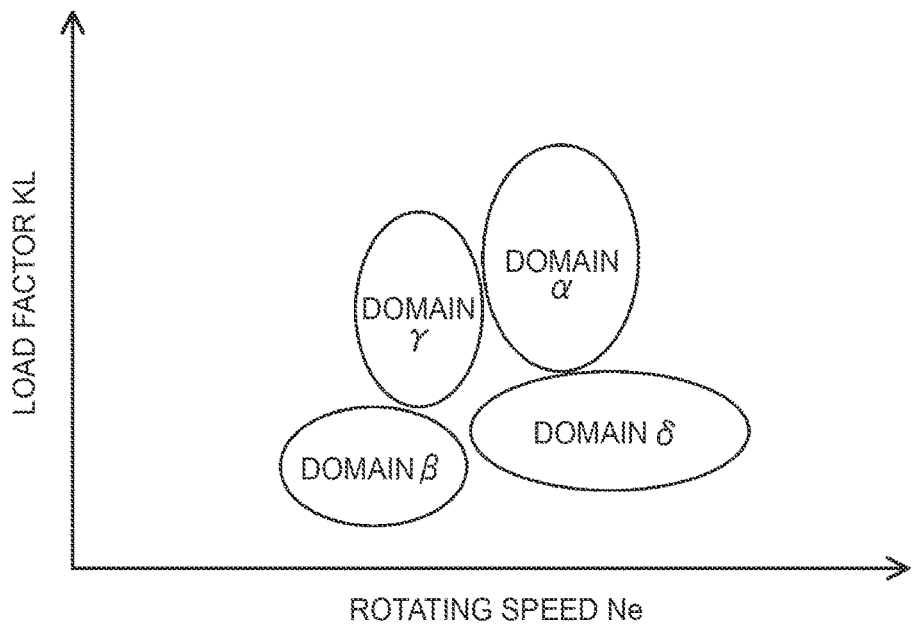
FIG. 2 is an explanatory diagram for explaining an example of regions α, β, γ, and δ.

ECU 70 stores the rotational speed Ne and the load factor KL of the engine 22 calculated at predetermined intervals in RAM 76. When the ignition switch 80 is turned off, ECU 70 determines whether the operating point indicated by the rotational speed Ne and the load factor KL is included in the high-rotation and high-load region α, the low-rotation and low-load region β, the low-rotation and high-load region γ, or the high-rotation and low-load region δ, using the rotational speed Ne and the load factor KL of the engine 22 for one trip (a period from when the ignition switch 80 is turned on until when the ignition switch is turned off) stored in RAM 76. FIG. 2 is an explanatory diagram for explaining an example of the regions α, β, γ, and δ. The regions α, β, γ, δ are set so that they do not overlap each other on the map defined by the rotational speed Ne and the load factor KL of the engine 22, as shown. ECU 70 calculates the ratio of the operation points included in the regions α, β, γ, and δ among all the operation points for one trip. When the ratio of the operation points included in the region α among all the operation points of the trip is equal to or greater than the predetermined ratio Rαref, the type of the trip is set to "region α multi-use trip", and the total number of trips set to "region α multi-use trip" in the past is stored in the flash memory 78. When the ratio of the operation points included in the region β among all the operation points of the trip is equal to or greater than the predetermined ratio Rβref, the type of the trip is set to "region β multi-use trip", and the total number of trips set to "region β multi-use trip" in the past is stored in the flash memory 78. When the ratio of the operation points included in the region γ among all the operation points of the trip is equal to or greater than the predetermined ratio Rγref, the type of the trip is set to "region γ multi-use trip", and the total number of trips set to "region γ multi-use trip" in the past is stored in the flash memory 78. When the ratio of the operation points included in the region δ among all the operation points of the trip is equal to or greater than the predetermined ratio Rδref, the type of the trip is set to "region δ multi-type trip", and the total number of trips set to "region δ multi-type trip" in the past is stored in the flash memory 78. The predetermined ratios Rαref, Rβref, Rγref, and Rδref may be the same ratio or different ratios.

ECU 70 stores the coolant temperature Tw detected by the water temperature sensor 42 when the ignition switch 80 is turned off in the flash memory 78 as the off-time water temperature Twoff. ECU 70 stores in the flash memory 78 the date and time set to CPU 72 as the date and time when the ignition switch 80 is turned off as the off date and time Toff.

In the vehicle 20 of the embodiment thus configured, basically, the engine 22 and the transmission 60 are controlled so that the required torque Te* (required power Pe*) corresponding to the accelerator operation amount Acc from the accelerator pedal position sensor 84 and the vehicle speed V from the vehicle speed sensor 88 travels while being outputted from the engine 22.

As the operation control of the engine 22, an intake air amount control for controlling the opening degree of the throttle valve 25, a fuel injection control for controlling the fuel injection amount from the fuel injection valve 26, an ignition control for controlling the ignition timing of the spark plug 30, and the like are performed. In the intake air amount control, ECU 70 sets the target air amount Qa* based on the required torque Te* of the engine 22, sets the target throttle opening degree TH* so that the intake air amount Qa becomes the target air amount *, and controls the throttle motor 36 so that the throttle opening degree TH of the throttle valve 25 becomes the target throttle opening degree TH*. In the fuel injection control, ECU 70 sets the target fuel injection amount Qf* so that the air-fuel ratio AF becomes the target air-fuel ratio AF* based on the intake air amount Qa, and controls the fuel injection valve 26 so that the fuel of the target fuel injection amount Qf* is injected from the fuel injection valve 26. In the ignition control, ECU 70 sets the target ignition timing Tf*, based on the rotational speed Ne and the load factor KL of the engine 22, and controls the spark plug 30 so that the ignition is performed at the target ignition timing Tf*.

Figure 3:
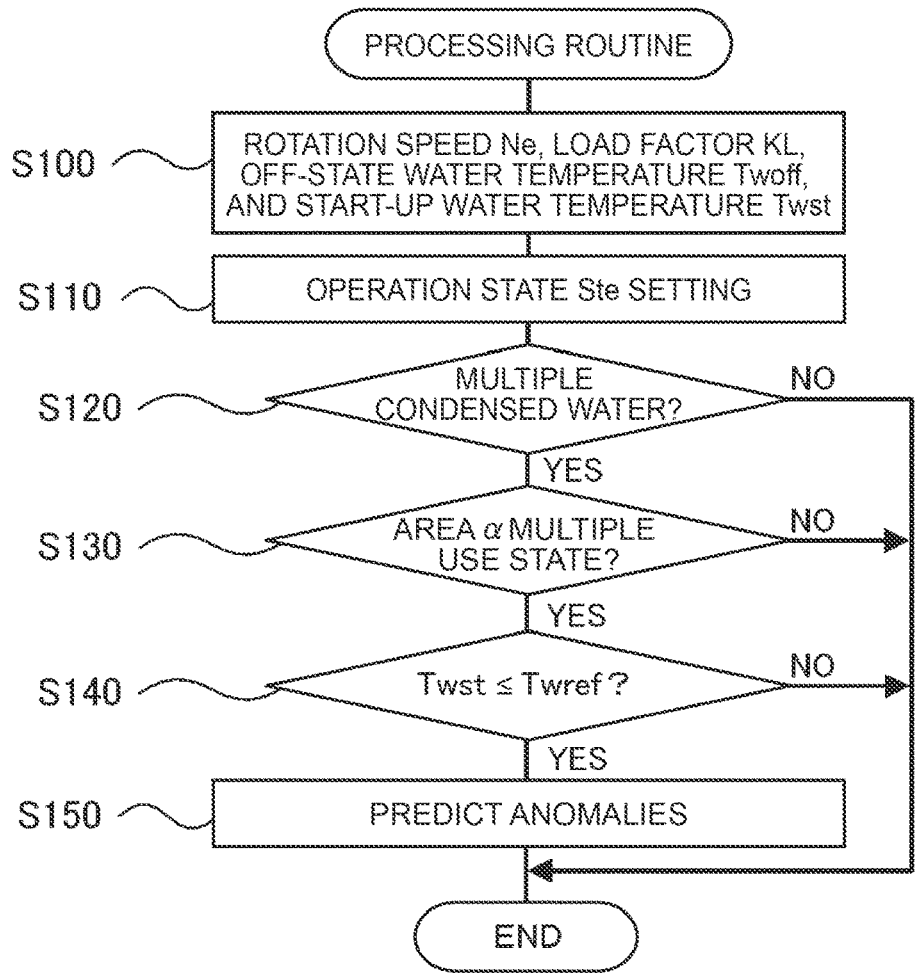
FIG. 3 is a flow chart illustrating an exemplary process routine executed by ECU 70.

Next, the operation of the abnormality predicting device of the engine 22 mounted on the vehicle 20 of the embodiment thus configured, in particular, the operation when predicting the abnormality occurring in the inner surface of the cylinder 37 will be described. FIG. 3 is a flow chart illustrating an exemplary process performed by ECU 70. This routine is repeatedly executed after the ignition switch 80 is turned on.

When the process routine of FIG. 3 is executed, CPU 72 of ECU 70 first receives the rotational speed Ne and the load factor KL of the engine 22, the off-time water temperature Twoff, the start-time water temperature Twst, and the like (S100). Here, the rotational speed Ne of the engine 22 is calculated based on the crank angle θcr from the crank position sensor 40. The load factor KL of the engine 22 is calculated based on the intake air amount Qa from the air flow meter 48 and the rotational speed Ne of the engine 22. The off-state water temperature Twoff stored in the flash memory 78 is inputted. The starting water temperature Twst receives the coolant temperature Tw detected by the water temperature sensor 42 when the engine 22 is first started after the ignition switch 80 is turned on.

Subsequently, the operation state Ste of the engine 22 is set based on the type of the trips (the region α polymorphic trip, the region β polymorphic trip, and the like) stored in the flash memory 78 having the largest total number of trips (S110). Here, when the number of trips of the region α multi-use trip is the largest, the operation state Ste of the engine 22 is set to the region α multi-use state (high-rotation high-load multi-use state). When the number of trips of the region β multi-use trip is the largest, the operation state Ste of the engine 22 is set to the region β multi-use state (low-rotation low-load multi-use state). When the number of trips of the region γ multi-use trip is the largest, the operation state Ste of the engine 22 is set to the region γ multi-use state (low-rotation high-load multi-use state). When the number of trips of the region δ multi-use trip is the largest, the operation state Ste of the engine 22 is set to the region δ multi-use state (high-rotation high-load multi-use state). The operation state Ste of the engine 22 set in this way reflects the state of use of the vehicle 20 of the user. For example, when the user frequently uses sporty driving in the vehicle 20, it is considered that the engine 22 is operated at a high rotational speed and a high load, resulting in a region α multiple use state.

Figure 4:
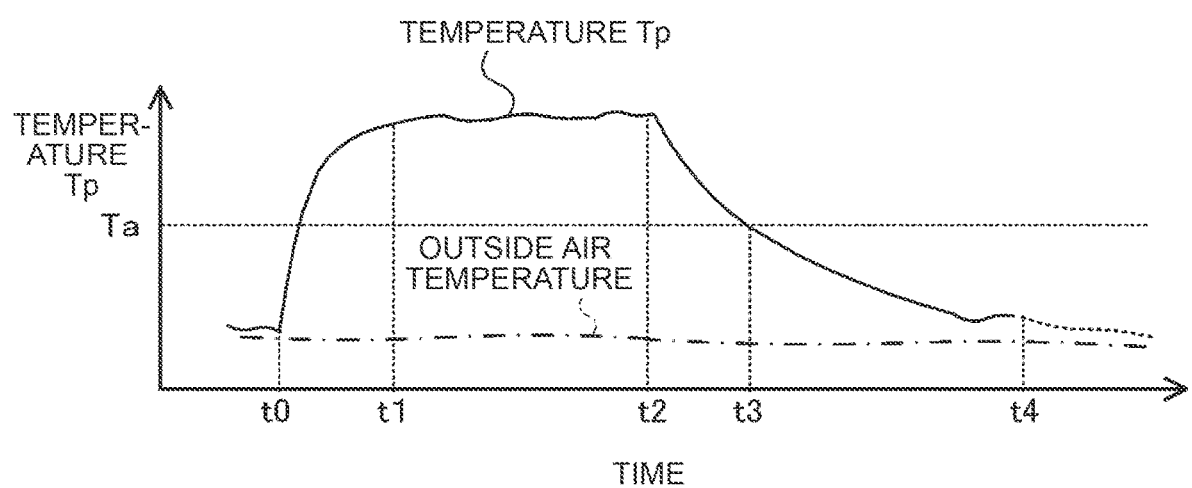
FIG. 4 is an explanatory diagram illustrating an exemplary temporal change in the temperature Tp of the components constituting the engine 22.

After the operation state Ste is set in this way, it is determined whether or not a large amount of condensed water is generated in the engine 22 based on the off-time water temperature Twoff (step 120). FIG. 4 is an explanatory diagram illustrating an exemplary temporal change in the temperature Tp of the components constituting the engine 22. In the drawing, a solid line represents a temporal change of a temperature Tp of a certain component constituting the engine 22, and a dashed-dotted line represents an exemplary temporal change of an outside air temperature. When the ignition switch 80 is turned on and the engine 22 starts to operate (time t0), the temperature Tp increases. Then, when the warm-up of the engine 22 is completed (time t1), the components are cooled by a cooling system (not shown) of the engine 22, and the temperature Tp is maintained. When the ignition switch 80 is turned off (time t2), the temperature Tp gradually decreases, and when the temperature Tp becomes equal to or lower than the dew point temperature Ta, the gas of the cylinder 37 condenses and condensed water is generated (time t3). When the time when the temperature Tp becomes lower than or equal to the dew point temperature Ta is long, the amount of condensed water becomes larger than that when the time is short. In S120, when the temperature Tp becomes equal to or lower than the dew point temperature Ta after the ignition switch 80 is turned off and the time (time from the time t3 to the time t4 in FIG. 4) from when the temperature Tp becomes equal to or lower than the dew point temperature Ta until when the ignition switch 80 is turned on (time t4) is equal to or more than a predetermined time tref, it is determined that a large amount of condensed water is generated in the cylinder 37. In the embodiment, since the detected value from the water temperature sensor 42 cannot be inputted to ECU 70 when the ignition switch 80 is off, the temperature Tp is set using the off-time water temperature Twoff, the elapsed time toff since the ignition switch 80 is off, and the following equation (1). In Expression (1), "a" and "n" are constants determined by experiments, analysis, machine learning, and the like for each component. The predetermined time tref is a time determined in advance by experimentation, analysis, machine learning, or the like as a time when the amount of condensed water exceeds a predetermined amount of water for determining whether or not the amount of condensed water causes the cylinder 37 to corrode.

(1)
$$Tp = Twoff - a \cdot \frac{1}{\sqrt[n]{toff}} \quad (1)$$

When S120 does not cause a large amount of condensate to be generated in the engine 22, the routine is terminated. When a large amount of condensed water is generated in the engine 22 in S120, it is subsequently determined whether or not the operation state Ste is the region α multi-use state (S130). When the operation state Ste is the region α multi-use condition, that is, when the engine 22 is frequently operated at a high rotational speed and at a high load, high-density operation of nitrogen oxides (NOx) is frequently performed. Therefore, when a large amount of condensed water is generated in the engine 22, it is considered that the cylinder 37 is easily corroded. Therefore, S130 is a process for determining whether or not the cylinder 37 is easily corroded.

When the operation state Ste is not in the region α multi-use state in S130, the routine ends. When the operation state Ste in S130 is the region α multi-use state, it is determined whether or not the water temperature Twst at the time of starting is equal to or less than a predetermined water temperature Twref (S140). The predetermined water temperature Twref is a threshold for determining whether the warm-up of the engine 22 has ended. Even if a large amount of condensed water is generated when the ignition switch 80 is off, it is considered that the situation in which the condensed water evaporates and the inner surface of the cylinder 37 is easily corroded is eliminated when the warm-up of the engine 22 is completed. Therefore, S140 is a process for determining whether or not the condition in which the cylinder 37 is easily corroded has been eliminated.

When the water temperature Twst at the time of start-up exceeds the predetermined water temperature Twref in S140, the routine ends. In S140, when the start-up water temperature Twst is equal to or lower than the predetermined water temperature Twref, it is predicted (S140) that a corrosive error occurs on the inner surface of the cylinder 37, and this routine is ended. By such a process, it is possible to predict an abnormality in which the inner surface of the cylinder 37 corrodes, that is, the occurrence of an abnormality in the engine 22. When an abnormality in which the inner surface of the cylinder 37 corrodes is predicted in this way, a notification device for notifying information such as a display in a vehicle cabin (not shown) may notify a content such as "confirm the inner surface of the cylinder with a scope when the spark flag is removed by warehousing" or "confirm whether or not there is a sudden deterioration in LOC" to urge the user to pay attention.

According to the vehicle 20 equipped with the abnormality predicting device of the engine 22 of the embodiment described above, the operation state Ste (the state of use of the vehicle 20) of the engine 22 is determined based on the rotational speed Ne and the load factor KL of the engine 22, whether or not the condensed water is generated in the engine 22 is determined based on the time tsop, and when the amount of condensed water generated in the engine 22 is equal to or more than the predetermined amount of water (when the condensed water is generated) and when the water temperature Twst at the time of starting is equal to or less than the predetermined water temperature Twref, the abnormality of the engine 22 can be predicted more appropriately by predicting the occurrence of the abnormality of the cylinder 37 (the abnormality of the engine 22).

In the vehicle 20 equipped with the abnormality predicting device of the engine 22 according to the embodiment, it is determined whether or not the amount of condensed water is large in S120, but it may be determined whether or not condensed water is generated. Further, S140 may not be executed.

In the vehicle 20 equipped with the abnormality predicting device for the engine 22 of the embodiment, a case where an abnormality in which corrosion occurs on the inner surface of the cylinder 37 is predicted is exemplified. However, examples of the abnormality to be predicted include an abnormality in which the engine oil deteriorates due to the accumulation of the condensed water in the oil pan, an abnormality in an oil pump that pumps the engine oil, an abnormality in which the condensed water accumulates in EGR pipe 152 and the intake pipe 24 of EGR device 150, an abnormality in which the engine 22 misfires due to the accumulation of the condensed water, and an abnormality in which the depositions accumulate in EGR pipe 152, the intake pipe 24, and the blow-by gas pipe 90 of EGR device 150.

When predicting an anomaly in which the engine oil deteriorates due to the accumulation of the condensed water in the oil pan, it is determined whether or not the operation state Ste is the region β multi-use state instead of S130, and S140 is not executed. Condensed water generated in the cylinder 37 is transmitted to the oil pan and mixed into the engine oil, but evaporates when the engine 22 is completely warmed up. When the operation state Ste is in the region β multi-use condition, that is, when the engine 22 is frequently operated at low speed and low load, that is, when there are many short trips, it is considered that the condensed water mixed in the engine oil cannot be evaporated and remains, and the engine oil is likely to deteriorate due to emulsification or the like. Therefore, it is possible to predict an anomaly in which the engine oil deteriorates properly by determining whether or not the operation state Ste is the region β multi-use state instead of S130.

In predicting the abnormality of the oil pump that feeds the engine oil, instead of S130, it is determined whether or not the operation state Ste is the region β multi-use state, and instead of S140, it is determined whether or not the outside air temperature is less than zero degrees Celsius, whether or not the temperature of the engine oil at the time of starting the engine 22 is less than zero degrees Celsius, and whether or not the vehicle 20 has a long stop time. The condensed water generated in the cylinder 37 and in the crankcase 31 accumulates at the bottom of the oil pan and freezes at less than zero degrees Celsius. Freezing of the condensed water tends to cause an abnormality in an oil pump that pumps the engine oil. The condensed water mixed in the engine oil tends to be evaporated when the operation state Ste the region β is in a multi-use state, that is, when the engine 22 is frequently operated at a low rotational speed and at a low load, that is, when there are many short trips. Then, it is considered that the condensed water mixed in the engine oil is likely to freeze when the outside air temperature is less than zero degrees Celsius, the temperature of the engine oil is less than zero degrees Celsius, and the vehicle 20 stops for a long time. Therefore, in place of S130, it is determined whether or not the operation state Ste is the region β multi-use condition, and in place of S140, it is determined whether or not the outside air temperature is less than zero degrees Celsius, whether or not the temperature of the engine oil at the time of starting the engine 22 is less than zero degrees Celsius, and whether or not the stopping time of the vehicle 20 is long.

When predicting an anomaly in which the engine 22 misfires due to the accumulation of condensed water in EGR pipe 152 and the intake pipe 24 of EGR device 150, it is determined whether or not the operation state Ste is in the region β multi-use state instead of S130, and the process routine is executed once per trip without executing S140. It is considered that the condensed water accumulated in EGR pipe 152 and the intake pipe 24 of EGR device 150 evaporates when the engine 22 is heavily loaded. Therefore, when the operation state Ste is in the region β multi-use state, that is, when the engine 22 is frequently operated at low rotational speed and low load, the condensed water in EGR pipe 152 and the intake pipe 24 is unlikely to evaporate. Further, when the engine 22 is started next, since the condensed water accumulated in the intake pipe 24 together with the intake air moves to the combustion chamber, the process routine is executed once per trip, EGR device 150 It can predict an abnormality in which the engine 22 is misfired by condensed water accumulates in the pipe 152 and the intake pipe 24. Therefore, it is determined whether or not the operation state Ste is in the region β multi-use state instead of S130, and the process routine is executed once per trip without executing S140, whereby it is possible to predict an anomaly in which the engine 22 misfires properly.

When predicting an anomaly caused by depositions being deposited in EGR pipe 152, the intake pipe 24, and the blow-by gas pipe 90 of EGR device 150, it is determined whether or not the operation state Ste is the region β multi-use state instead of S130, and S140 is not executed. Depositions in EGR pipe 152, the intake pipe 24, and the blow-by gas pipe 90 are often accumulated by operating the engine 22 at low rotational speed and at low loads. Therefore, it is determined whether or not the operation state Ste is in the region β multi-use state instead of S130, and by not executing S140, it is possible to predict an anomaly caused by deposits being properly accumulated in EGR pipe 152, the intake pipe 24, and the blow-by gas pipe 90.

In the vehicle 20 equipped with the abnormality predicting device of the engine 22 according to the embodiment, the type of the trip is set to "region α multi-use trip", "region β multi-use trip", or the like by using the rotational speed Ne and the load factor KL of the engine 22. However, instead of the rotational speed Ne and the load factor KL, the type of the trip, that is, the operation state Ste of the engine 22 and the state of use of the vehicle may be set by using at least one of a maximum value or an average value of the rotational speed Ne in one trip, a maximum value or an average value of the vehicle speed V, an average value of the load factor KL, a time of one trip, and on/off of the brake pedal 85.

As for the correspondence between the main elements of the embodiment and the main elements of the disclosure described in SUMMARY, since the embodiment is an example for specifically describing a mode for carrying out the disclosure described in SUMMARY, the embodiment does not limit the elements of the disclosure described in SUMMARY. In other words, the interpretation of the disclosure described in SUMMARY should be performed based on the description in SUMMARY, and the embodiment is merely a specific example of the disclosure described in SUMMARY.

The present disclosure is applicable to a manufacturing industry of an abnormality predicting device for an engine.

What is claimed is:

1. An engine abnormality predicting device configured to predict the occurrence of an engine abnormality in an engine installed in a vehicle, wherein the engine abnormality predicting device comprising:
   a processor; and
   a memory storing executable instructions that cause the processor to
   acquire a crank angle from a crank position sensor and an intake air amount from an air flow meter attached to an intake pipe of the engine;
   calculate a rotational speed of the engine based on the acquired crank angle and a load factor of the engine based on the calculated rotational speed and the acquired intake air amount;
   store the rotational speed and the load factor in the memory at predetermined intervals,
   wherein in response to an ignition switch being turned off, the processor acquires an off time water temperature that is detected by a water temperature sensor of the engine in response to the ignition switch of the vehicle being turned off,
   determines a corresponding engine operation point indicated by the rotational speed and the load factor that is stored for at each predetermined interval of the predetermined intervals,
   determines a region of a map of the rotational speed and the load factor having the highest count of engine operation points during a trip, the trip being a period of time from when the ignition switch is turned on until the ignition switch is turned off,
   determines whether condensed water is produced in the engine, based on elapsed time after stopping the engine,
   predicts the engine abnormality based on the region of the map having the highest count of engine operation points in a case where the processor determines that condensed water is produced in the engine and
   displays a screen including a notification on a display provided in a cabin of the vehicle to notify a user of the vehicle of the predicted engine abnormality as determined based on the region of the map having the highest count of engine operation points and the determination that condensed water is produced in the engine.

2. The engine abnormality predicting device according to claim 1, wherein the amount of the condensed water produced in the engine is equal to or exceeds a predetermined amount of water.

* * * * *